(12) United States Patent
Lee et al.

(10) Patent No.: US 9,924,055 B1
(45) Date of Patent: Mar. 20, 2018

(54) CALIBRATION METHOD FOR TRACKING SENSOR

(71) Applicant: PixArt Imaging (Penang) SDN. BHD., Penang (MY)

(72) Inventors: Wui Pin Lee, Penang (MY); Sai Mun Lee, Penang (MY)

(73) Assignee: PixArt Imaging (Penang) SDN. BHD., Penang (MY)

( * ) Notice: Subject to any disclaimer, the term of this patent is extended or adjusted under 35 U.S.C. 154(b) by 0 days.

(21) Appl. No.: 15/382,753

(22) Filed: Dec. 19, 2016

(51) Int. Cl.
 *H04N 1/00* (2006.01)

(52) U.S. Cl.
 CPC ..... *H04N 1/00779* (2013.01); *H04N 1/00702* (2013.01); *H04N 1/00734* (2013.01); *H04N 1/00748* (2013.01)

(58) Field of Classification Search
 CPC ........... H04N 1/00779; H04N 1/00702; H04N 1/00734; H04N 1/00819
 USPC ................................. 358/406, 1.2, 3.26, 504
 See application file for complete search history.

(56) References Cited

U.S. PATENT DOCUMENTS

| | | | | |
|---|---|---|---|---|
| 2006/0086275 | A1* | 4/2006 | Fermandez | B41J 11/46 101/485 |
| 2010/0047000 | A1* | 2/2010 | Park | G03G 15/5062 399/394 |

* cited by examiner

*Primary Examiner* — Jamares Q Washington
(74) *Attorney, Agent, or Firm* — Winston Hsu

(57) ABSTRACT

A media tracking sensor (MTS) apparatus for performing a calibration procedure to determine a resolution calibration factor includes: a full sensor array including: a first virtual array, having a first width, for capturing a calibration reference image; and a second virtual array having a third width equal to the first width, for capturing a plurality of images and comparing the captured images with the calibration reference image. The MTS apparatus further includes a print media positioned below the full sensor array; and a host system for moving the print media below the full sensor array. When the first virtual array captures the calibration reference image, motion data of the full sensor array will be set to zero, and when an image captured by the second virtual array matches the calibration reference image, total motion data will be recorded and used to determine the resolution conversion factor.

8 Claims, 3 Drawing Sheets

CALIBRATION METHOD FOR TRACKING SENSOR

BACKGROUND OF THE INVENTION

1. Field of the Invention

This invention relates generally to tracking sensors, and more particularly, to a calibration method for a media tracking sensor.

2. Description of the Prior Art

Media tracking sensors (MTS) can be used for line tracking and edge detection on print media, by performing relative frame by frame analysis to calculate motion. As a standard MTS array for a tracking sensor has many parameters which can affect the resolution of the captured images, calibration needs to be performed.

A standard array setup for a media tracking sensor calibration procedure is shown in FIG. 1A. The array 100 comprises an MTS module 125 containing a tracking lens. The MTS module is used to image print media held in a media holder powered by a precision linear stage (not shown). As the print media moves forward, the MTS module will calculate a total Dx count, representing a Count-Per-Inch (CPI). The media moves following the motion profile illustrated in FIG. 1B. Initially, the media is accelerated from zero, and then moves at a constant speed before decelerating back to zero. This procedure is repeated a number of times; often, as many as thirty. The total reported CPI will be divided by the number of repetitions to give an average CPI.

The array setup means there are a number of parameters to be considered. The height of the sensor on the array and the lens magnification are variable and depend on the particular setup and array which is used. Further, different types of print media can have microscopic differences, resulting in a resolution different from a target resolution. Any variation from procedure to procedure will cause inaccuracies in the final average CPI. Moreover, any time the print media is changed the height of the array is changed, or a different lens is used, the entire calibration procedure must be repeated.

SUMMARY OF THE INVENTION

This in mind, the invention aims to provide a self-calibrating procedure, which can simplify the entire process.

This is achieved by a method and apparatus according to an exemplary embodiment of the present invention.

A method for calibrating a media tracking sensor (MTS) apparatus to determine a resolution calibration factor comprises: setting a first virtual array and a second virtual array in a full sensor array, wherein the first virtual array has a first width, and the second virtual is separated from the first virtual array by a second width and the second virtual array has a third width equal to the first width; positioning a print media below the full sensor array; moving the print media below the full sensor array; utilizing the first virtual array to capture a calibration reference image and setting motion data of the full sensor array to zero; utilizing the second virtual array to capture a plurality of images; comparing the captured images with the calibration reference image; when an image captured by the second virtual array matches the calibration reference image, recording the total motion data of the full sensor array; and utilizing the total motion data to determine the resolution conversion factor for the MTS apparatus.

A media tracking sensor (MTS) apparatus for performing a calibration procedure to determine a resolution calibration factor comprises: a full sensor array, which comprises: a first virtual array, having a first width, for capturing a calibration reference image; and a second virtual array being separated from the first virtual array by a second width and having a third width which is equal to the first width, the second virtual array for capturing a plurality of images and comparing the captured images with the calibration reference image. The MTS apparatus further comprises a print media positioned below the full sensor array; and a host system for moving the print media below the full sensor array. When the first virtual array captures the calibration reference image, motion data of the full sensor array will be set to zero, and when an image captured by the second virtual array matches the calibration reference image, total motion data will be recorded and used to determine the resolution conversion factor for the MTS apparatus.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
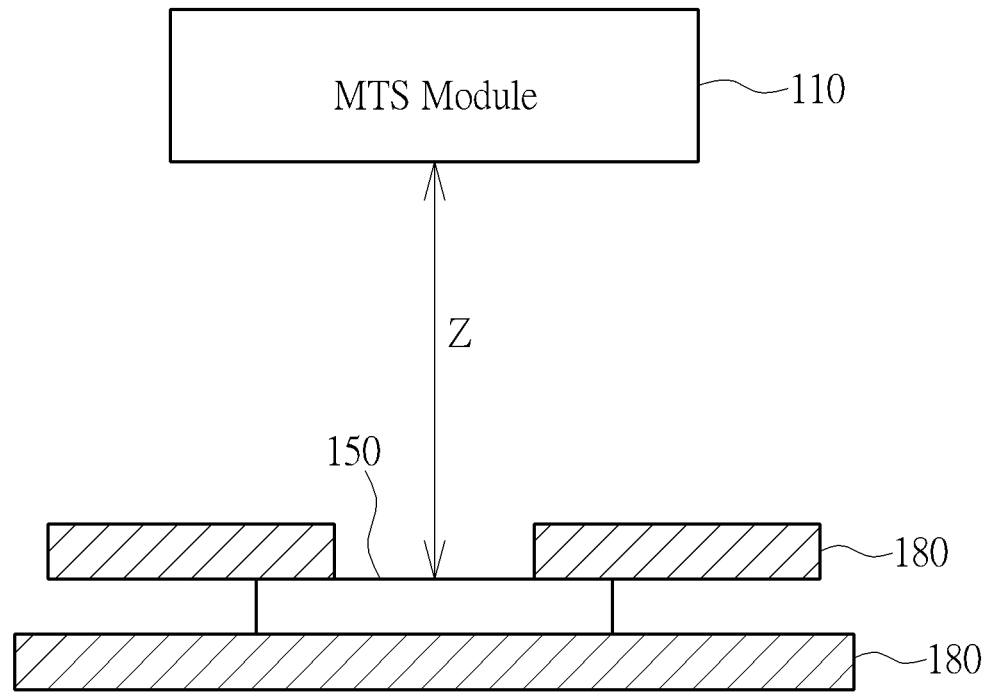
FIG. 1A is a diagram of a sensor array according to the related art.
Figure 1B:
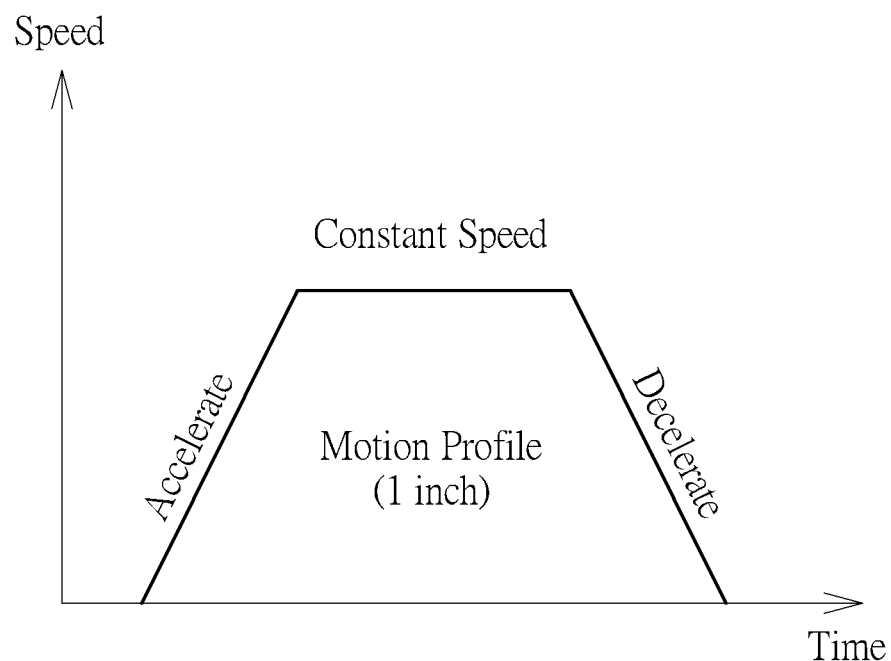
FIG. 1B is a motion profile graph of the sensor array shown in FIG. 1A.
Figure 2:
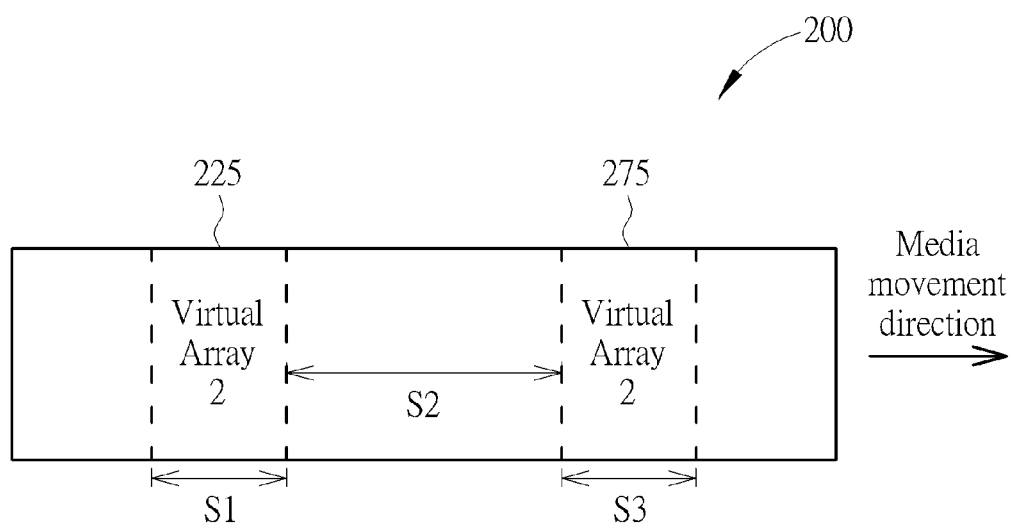
FIG. 2 is a diagram of a sensor array according to an exemplary embodiment of the present invention.

FIG. 2 is a diagram of a sensor array according to an exemplary embodiment of the present invention. As shown in the figure, the full sensor array comprises two virtual arrays with a separation S2 between them. The first virtual array (VA1) has a width S1 and the second virtual array (VA2) has a width S3. S1 and S3 can be any value determined by a designer, but S1 must be equal to S3. Although S1 and S3 can be any value (as long as they are equal to each other) it is advantageous that they are largely square.

The full sensor array is a long rectangular array. In calibration mode, the virtual arrays are activated. Please note that all parameters S1, S2, S3 are programmable by the sensor. This means that both the size and relative positions of the arrays can be altered.

The host system (not shown) moves a print media at a constant speed. The entire distance moved does not have to be a precise number but must be at least the length of the full sensor array. The Resolution Calibration Engine (RCE) of the sensor takes an image of the print media at VA1. This image is the reference image for the system. After the reference image is captured, motion data is reset to zero. The sensor array then continues to move in the same direction. At VA2, a captured image will be compared with the reference image. When a total match is found, the total motion data since the captured image at VA1 will be recorded.

The sensor can then use a number of set parameters to work out the resolution conversion factor (RCF) of the array. This is determined by the following equation:

$$RCF = (S1+S2) \times \text{pixel pitch}/\text{Total\_MOTION\_}X$$
$$\text{um/count}$$

wherein S1 is the width of the first virtual array (and is equal to S3) and S2 is the separation between VA1 and VA2.

S1, S2 and Total_MOTION_X are known by the host system. The pixel pitch depends on the particular media. Once the host array setup changes or the media changes, the simple calibration method can be re-initiated. Precise distance travelled is not important and the calibration procedure only needs to be performed once for each variation in setup parameters.

As opposed to the prior art, which requires the sensor array to be moved for a same distance, repeated approximately 30 times, and then performed again every time the setup changes, the method of the present invention only needs to be performed once, and does not require a precise distance to be moved.

By taking an image of the media as it passes VA1 then monitoring for the 2nd appearance at VA2, a total motion count can be determined by the sensor itself, in order to calculate the resolution conversion factor.

Moving of the media is performed by the host. Rather than the statistical analysis of the prior art (averaging a number of repetitions), the present invention performs a one-time calculation. The placement of the virtual arrays is performed by the chip. S1, S2 and S3 are also programmed by the chip.

Additionally, the above method and system can also perform a self-calibration by calculating the RCF for a first S1, S2 and S3, then re-programming the values and calculating RCF again for the same media and host array setup. This calibration method can be used to check that the chip is operating properly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A media tracking sensor (MTS) apparatus for performing a calibration procedure to determine a resolution calibration factor, the MTS apparatus comprising:
   a full sensor array comprising:
      a first virtual array, having a first width, for capturing a calibration reference image; and
      a second virtual array being separated from the first virtual array by a second width and having a third width which is equal to the first width, the second virtual array for capturing a plurality of images and comparing the captured images with the calibration reference image;
   a print media positioned below the full sensor array; and
   a host system for moving the print media below the full sensor array;
   wherein when the first virtual array captures the calibration reference image, motion data of the full sensor array will be set to zero, and when an image captured by the second virtual array matches the calibration reference image, total motion data will be recorded and used to determine the resolution conversion factor for the MTS apparatus.

2. The MTS apparatus of claim 1, wherein the calibration procedure is only performed once.

3. The MTS apparatus of claim 1, wherein the resolution conversion factor is determined by multiplying a pixel pitch of the full sensor array with the sum of the first width and the third width, and dividing the result by the total motion data.

4. The MTS apparatus of claim 1, wherein the position of the first virtual array and the second virtual array is programmable by the MTS apparatus.

5. A method for calibrating a media tracking sensor (MTS) apparatus to determine a resolution calibration factor, the method comprising:
   setting a first virtual array and a second virtual array in a full sensor array, wherein the first virtual array has a first width, and the second virtual is separated from the first virtual array by a second width and the second virtual array has a third width equal to the first width;
   positioning a print media below the full sensor array;
   moving the print media below the full sensor array;
   utilizing the first virtual array to capture a calibration reference image and setting motion data of the full sensor array to zero;
   utilizing the second virtual array to capture a plurality of images;
   comparing the captured images with the calibration reference image;
   when an image captured by the second virtual array matches the calibration reference image, recording the total motion data of the full sensor array; and
   utilizing the total motion data to determine the resolution conversion factor for the MTS apparatus.

6. The method of claim 5, wherein the calibration procedure is only performed once.

7. The method of claim 5, wherein the resolution conversion factor is determined by multiplying a pixel pitch of the full sensor array with the sum of the first width and the third width, and dividing the result by the total motion data.

8. The method of claim 5, wherein the position of the first virtual array and the second virtual array is programmable by the MTS apparatus.

* * * * *